United States Patent
Jung et al.

(10) Patent No.: US 10,506,477 B2
(45) Date of Patent: *Dec. 10, 2019

(54) METHOD FOR SIGNALING IN WIRELESS COMMUNICATION SYSTEM AND APPARATUS SUPPORTING SAME

(71) Applicant: LG ELECTRONICS INC., Seoul (KR)

(72) Inventors: Sunghoon Jung, Seoul (KR); Youngdae Lee, Seoul (KR); Sungduck Chun, Seoul (KR); Sungjun Park, Seoul (KR); Seungjune Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/828,956

(22) Filed: Dec. 1, 2017

(65) Prior Publication Data

US 2018/0103398 A1 Apr. 12, 2018

Related U.S. Application Data

(63) Continuation of application No. 14/415,310, filed as application No. PCT/KR2013/006426 on Jul. 18, 2013, now Pat. No. 9,860,799.

(Continued)

(51) Int. Cl.
*H04W 36/00* (2009.01)
*H04W 76/19* (2018.01)
(Continued)

(52) U.S. Cl.
CPC ........ *H04W 36/0055* (2013.01); *H04W 76/19* (2018.02); *H04W 76/27* (2018.02); *H04L 12/189* (2013.01)

(58) Field of Classification Search
CPC .......... H04W 36/0055; H04W 76/028; H04W 76/046

See application file for complete search history.

(56) References Cited

U.S. PATENT DOCUMENTS

| 6,377,563 | B1 | 4/2002 | Jeon et al. | |
| 9,860,799 | B2* | 1/2018 | Jung et al. | H04W 36/0055 |

(Continued)

FOREIGN PATENT DOCUMENTS

| CN | 101911815 A | 12/2010 |
| JP | 2011-135254 A | 7/2011 |

(Continued)

OTHER PUBLICATIONS

ETSI MCC, "Draft Report of 3GPP TSG RAN WG2 meeting #80, New Orleans, USA, Nov. 12-16, 2012," 3GPP TSG-RAN Working Group 2 meeting #81, R2-130002, St. Julian's, Malta, Jan. 28-Feb. 1, 2013, pp. 1-171 (two versions provided, 343 pages total).

(Continued)

*Primary Examiner* — Jackie Zuniga Abad
(74) *Attorney, Agent, or Firm* — Birch, Stewart, Kolasch & Birch, LLP

(57) ABSTRACT

A method for signaling performed by a user equipment (UE) in a wireless communication system, the method includes receiving, from a network, a radio resource control (RRC) reconfiguration message including a value; and starting a timer with the received value set to the timer upon transmitting a power preference indication (PPI) to the network, wherein another PPI is not transmitted to the network while the timer is running.

8 Claims, 17 Drawing Sheets

Related U.S. Application Data

(60) Provisional application No. 61/672,777, filed on Jul. 18, 2012.

(51) Int. Cl.
*H04W 76/27* (2018.01)
*H04L 12/18* (2006.01)

(56) References Cited

U.S. PATENT DOCUMENTS

| | | | |
|---|---|---|---|
| 2009/0124212 A1* | 5/2009 | Islam et al. | H04W 76/27 455/70 |
| 2010/0290427 A1 | 11/2010 | Sebire et al. | |
| 2011/0207465 A1 | 8/2011 | Dwyer et al. | |
| 2012/0129530 A1 | 5/2012 | Larmo et al. | |
| 2012/0207040 A1 | 8/2012 | Comsa et al. | |
| 2012/0252442 A1 | 10/2012 | Fu et al. | |
| 2014/0018085 A1* | 1/2014 | Young | H04W 52/0235 455/450 |

FOREIGN PATENT DOCUMENTS

| | | |
|---|---|---|
| KR | 1999-009676 A | 2/1999 |
| KR | 2002-0057954 A | 7/2002 |
| KR | 10-2004-0058030 A | 7/2004 |
| KR | 10-2009-0110899 A | 10/2009 |
| WO | WO 01/19122 A1 | 3/2001 |
| WO | WO 2009/041784 A2 | 4/2009 |
| WO | WO 2011/019308 A1 | 2/2011 |
| WO | WO 2011/098163 A1 | 8/2011 |
| WO | WO 2012/021879 A2 | 2/2012 |

OTHER PUBLICATIONS

LG Electronics Inc., "Further discussion on prohibit timer for PPI," 3GPP TSG-RAN WG2 #79bis, R2-124721, Bratislava, Slovakia, Oct. 8-12, 2012, pp. 1-3.

LG Electronics Inc., "Handling of IDC Indication during Handover," 3GPP TSG-RAN WG2 #79, R2-123460, Qingdao, China, Aug. 13-17, 2012, pp. 1-2.

Samsung, "UE Status Reporting," 3GPP TSG-RAN2#77 bis meeting, Tdoc R2-122638, Jeju South Korea, Mar. 26-30, 2012, 5 pages, XP-50607345A.

Samsung et al., "Discussion on continuing ROHC context after handover," R2-122344, 3GPP TSG-RAN WG2 Meeting #78, Prague, Czech Republic, May 21-25, 2012, pp. 1-2.

LG Electroncis Inc., "Further discussion on MBMS Interest Indication," 3GPP TSG-RAN WG2 #78, R2-122567, Prague, Czech Republic, Mar. 26-30, 2012, pp. 1-3.

NEC, "Radio Link Failure recovery on non prepared eNB", 3GPP TSG-RAN WG2#61, Tdoc R2-081170, Sorrento, Italy, Feb. 11-15, 2008, 8 pages.

* cited by examiner

METHOD FOR SIGNALING IN WIRELESS COMMUNICATION SYSTEM AND APPARATUS SUPPORTING SAME

CROSS-REFERENCE TO RELATED APPLICATIONS

This Application is a Continuation of U.S. patent application Ser. No. 14/415,310 filed on Jan. 16, 2015, (now U.S. Pat. No. 9,860,399 issued on Jan. 2, 2018), which is the National Phase of PCT International Application No. PCT/KR2013/006424 filed on Jul. 18, 2013, which claims the benefit under 35 U.S.C. § 119(e) to U.S. Provisional Application No. 61/672,777 flied on Jul. 18, 2012, all of which are hereby expressly incorporated by reference into the present application.

BACKGROUND OF THE INVENTION

Field of the Invention

The present invention relates to wireless communications, and more particularly, to a signaling method performed by a user equipment in a wireless communication system, and an apparatus supporting the method.

Discussion of the Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A network may enable a transmission of a UE-originated indication including UE-related information, e.g., information regarding a UE operation environment, a service desired to be received, etc. When the UE-related information is acquired through the UE-originated indication, the network may be operated such that a UE can receive a specific service or the UE can move on the basis of frequency and/or cell information provided from the UE-related information.

Although the UE-originated indication provided by the UE has the aforementioned effectiveness, a frequent transmission thereof may cause an inefficient utilization of a radio resource. To avoid this, a prohibit timer may be applied so that the UE is configured not to transmit the UE-originated indication during a timer is running. Meanwhile, there is a need to consider how to handle the prohibit timer for restricting the transmission of the UE-originated indication during the UE moves from one cell to another.

SUMMARY OF THE INVENTION

The present invention provides a signaling method in a wireless communication system, and an apparatus supporting the method.

In an aspect, there is provided a signaling method performed by a user equipment (UE) in a wireless communication system. The method includes starting a prohibit timer in regard to a transmission of a first UE-originated indication and restarting the prohibit timer when a handover indication message is received from a network.

The transmission of UE-originated indication may be restricted during the prohibit timer is running.

The method may further include performing a handover upon receiving the handover indication message, wherein the restarting of the prohibit timer is performed after the handover is complete.

The method may further include transmitting a second UE-originated indictor after the handover is complete, wherein the restarting of the prohibit timer is performed according to the second UE-originated indication.

The transmitting of the second UE-originated indication may be performed when the first UE-originated indication is transmitted within a duration of 1 second prior to a time point of receiving the handover indication message.

The prohibit timer may be restarted when the second UE-originated indication indicates a normal operation.

The method may further include receiving a UE-originated indication configuration, wherein the UE-originated indication configuration indicates that the UE is configured to provide the UE-originated indication. The UE-originated indication configuration may contain a prohibit timer set value, and the started prohibit timer may be set to the prohibit timer set value of the UE-originated indication configuration.

The method may further include starting a radio resource control (RRC) connection re-establishment procedure; and stopping the prohibit timer when the RRC connection re-establishment procedure starts.

In another aspect, there is provided a user equipment (UE) operating in a wireless communication system. The UE comprises a radio frequency (RF) unit for transmitting and receiving a radio signal; and a processor operatively coupled to the RF unit, wherein the processor is configured for starting a prohibit timer in regard to a transmission of a first UE-originated indication; and restarting the prohibit timer when a handover indication message is received from a network.

According to an embodiment of the present invention, a transmission of a user equipment (UE)-originated indication can be effectively controlled by running a prohibit timer. In doing so, an indiscrete transmission of the UE-originated indication is avoided, thereby being able to prevent a waste of radio resources. The UE-originated indication can be provided to a network and thus optimized configuration information for a UE operation can be provided.

According to an embodiment of the present invention, a control timer which controls UE-originated indication signaling can be properly controlled during a mutual procedure between a UE and a network. In doing so, a transmission of the UE-originated indication can be more flexibly performed, and thus the network can effectively provide configuration information optimized to the UE.

DETAILED DESCRIPTION OF THE EMBODIMENTS

Figure 1:
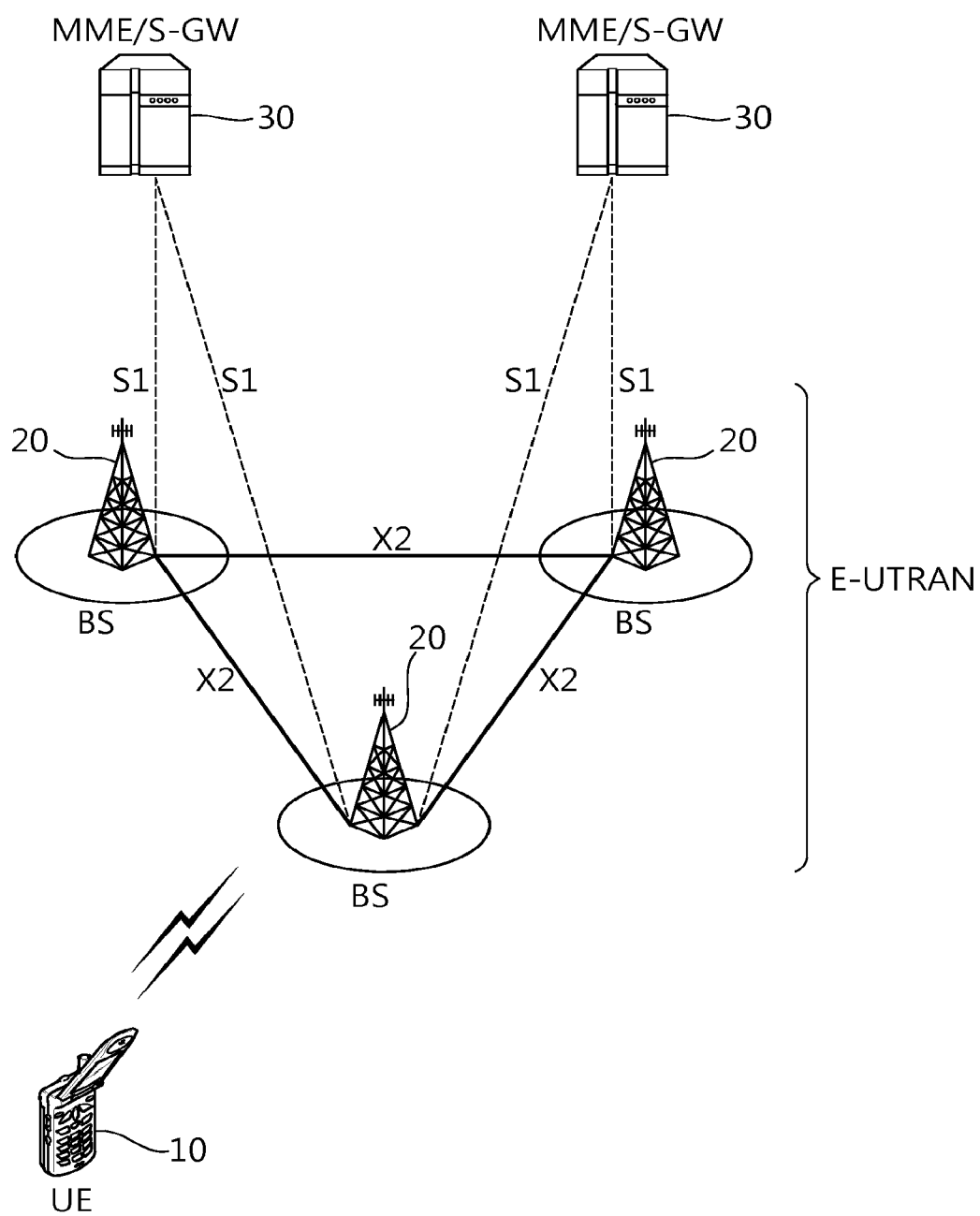
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
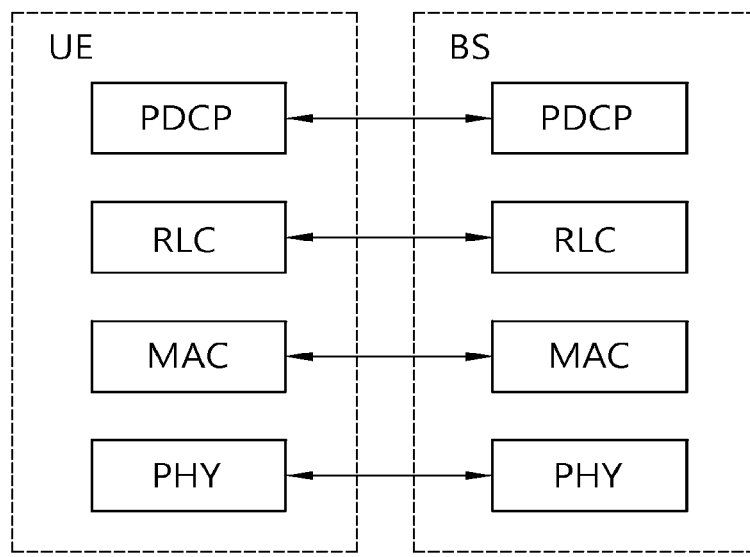
FIG. 2 is a block diagram showing the structure of a wireless protocol on the user plane.
Figure 3:
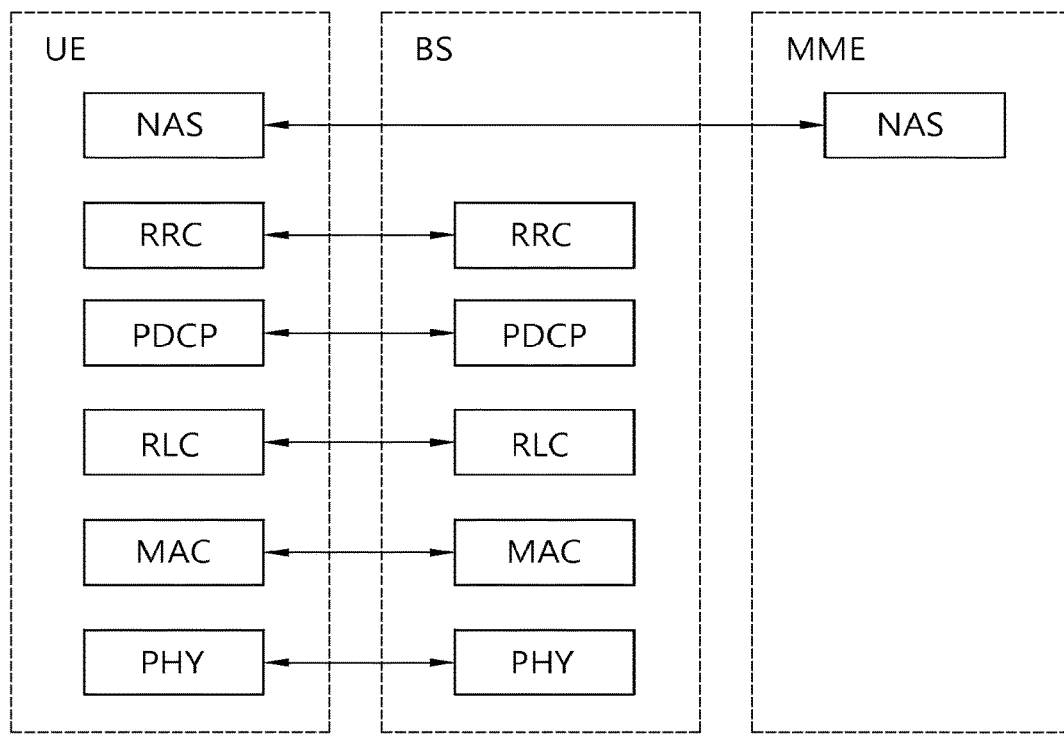
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell.

In accordance with Paragraph 5.2.2 of 3GPP TS 36.331 V8.7.0 (2009-09) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs UE of information about the transmission of SIBs, for example, a transmission cycle. The SIB is a set of pieces of correlated system information. For example, a specific SIB includes only information about surrounding cells, and a specific SIB includes only information about an uplink radio channel used by UE.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
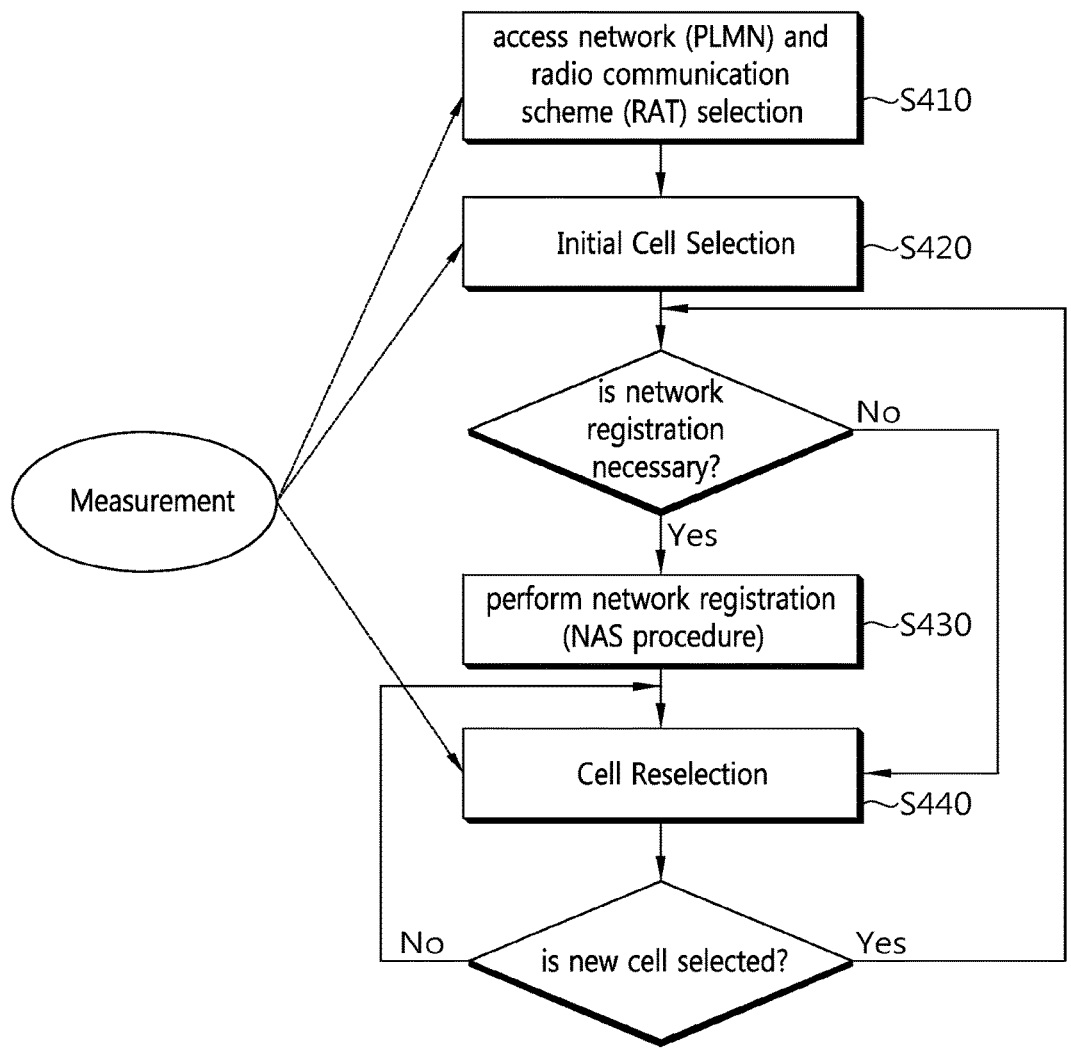
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
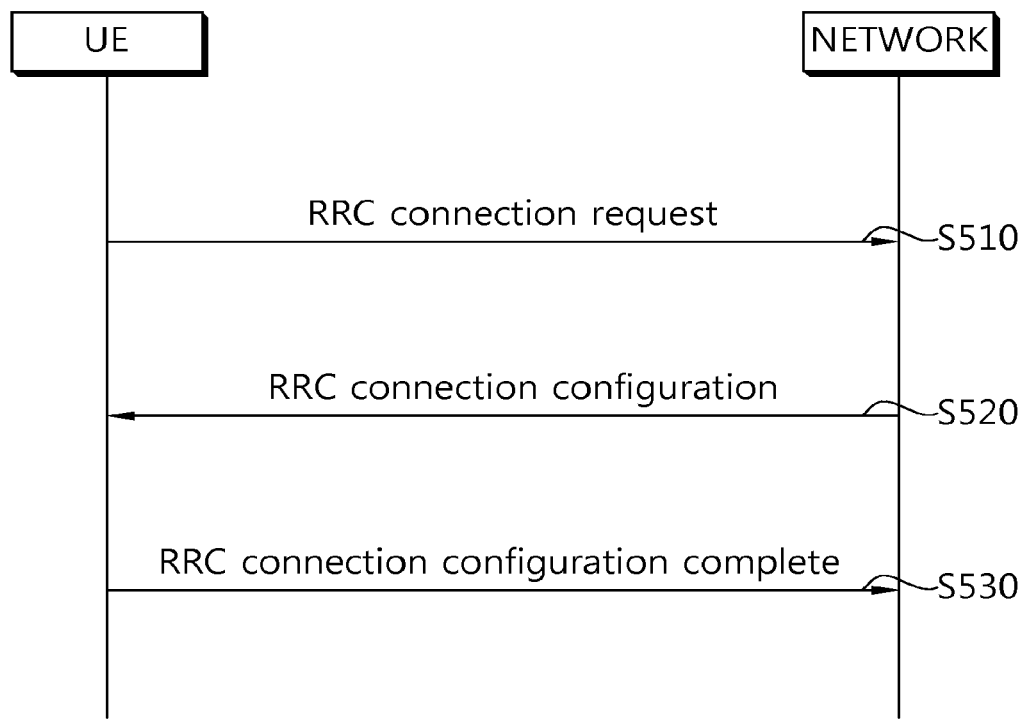
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
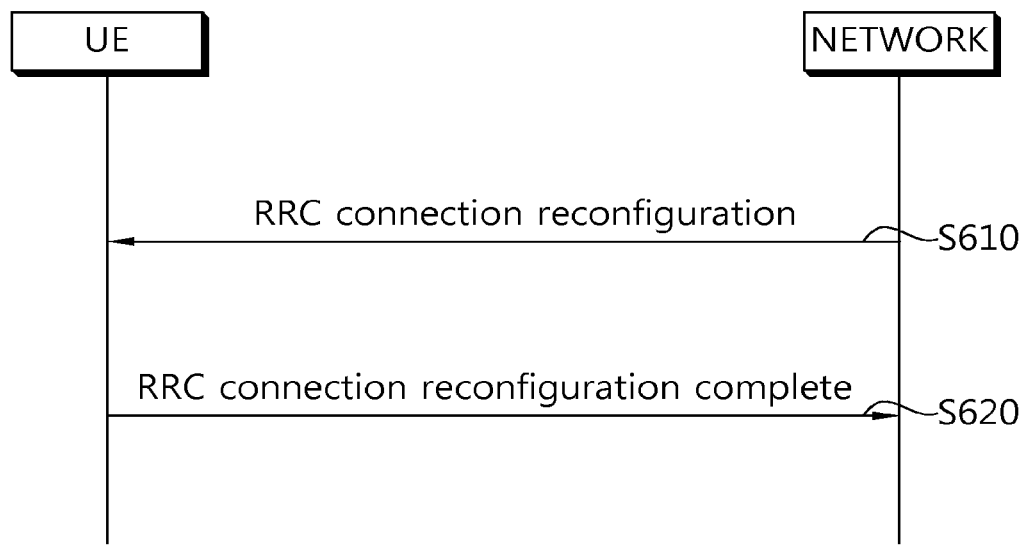
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following description relates to a public land mobile network (PLMN).

The PLMN is a network deployed and managed by a mobile network operator. Each mobile network operator manages one or more PLMNs. Each PLMN may be identified with mobile country code (MCC) and mobile network code (MNC). PLMN information of a cell is broadcast by being included in system information.

Various types of PLMNs may be considered by a UE in a PLMN selection, a cell selection, and a cell re-selection.

Home PLMN (HPLMN): PLMN having MCC and MNC which are matched with MCC and MNC of UE IMSI.

Equivalent HPLMN (EHPLMN): PLMN considered as equivalence of HPLMN.

Registered PLMN (RPLMN): PLMN of which a location registration is successfully complete.

Equivalent PLMN (EPLMN): PLMN considered as equivalence of RPLMN.

Each mobile service consumer subscribes to the HPLMN. When a normal service is provided to a UE by the HPLMN or the EHPLMN, the UE is not in a roaming state. On the other hand, when a service is provided to the UE by the PLMN other than the HPLMN/EHPLMN, the UE is in the roaming state, and the PLMN is called a visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

Next, a procedure for selecting a cell by a UE is described in detail.

When the UE is powered on or camps on a cell, the UE selects/reselects a cell having proper quality and performs procedures for receiving a service.

The UE in an RRC_idle state needs to always select the cell having proper quality and to be prepared to receive the service through the cell. For example, the UE that has been just powered on needs to select the cell having proper quality so as to be registered to a network. If the UE in an RRC connected state enters the RRC_idle state, the UE needs to select a cell on which the UE camps in the RRC_idle state. As such, a process of selecting a cell satisfying a certain condition by the UE in order to camp on in a service standby state such as the RRC_idle state is called a cell selection. An important point is that the cell needs to be selected as quickly as possible because the cell selection is performed in a state in which the UE has not determined a cell on which the UE will camp in the RRC_idle state. Therefore, if a cell provides radio signal quality higher than or equal to a specific reference, the cell may be selected in the cell selection process of the UE even though the cell is not a cell providing best radio signal quality to the UE.

Now, with reference to the 3GPP TS 36.304 V8.5.0 (2009-03) "User Equipment (UE) procedures in idle mode (Release 8)", a method and procedure for selecting a cell by a UE in 3GPP LTE are described in detail.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on.

Inter-RAT cell reselection: UE reselects a cell that uses RAT different from RAT on which the UE camps.

The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may be called a common priority, and a cell reselection priority determined for each UE by a network may be called a dedicated priority. When the dedicated priority is received, the UE may receive a validity time related to the dedicated priority together. When the dedicated priority is received, the UE starts a validity timer which is set to the validity time received together. The UE applies the dedicated priority in an RRC_idle mode during the validity timer is running. When the validity timer expires, the UE discards the dedicated priority, and applies the common priority again.

For the inter-frequency cell reselection, the network may provide the UE with a parameter (e.g., a frequency-specific offset) used in cell reselection for each frequency.

For the intra-frequency cell reselection or the inter-frequency cell reselection, the network may provide the UE with a neighboring cell list (NCL) used in cell reselection. The NCL includes a cell-specific parameter (e.g., a cell-specific offset) used in cell reselection.

For the intra-frequency or inter-frequency cell reselection, the network may provide the UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, R_n = Q_{meas,s} - Q_{offset}$$

In this case, $R_s$ is the ranking criterion of a serving cell, $R_n$ is the ranking criterion of a neighbor cell, $Q_{meas,s}$ is the quality value of the serving cell measured by UE, $Q_{meas,n}$ is the quality value of the neighbor cell measured by UE, $Q_{hyst}$ is the hysteresis value for ranking, and $Q_{offset}$ is an offset between the two cells.

In Intra-frequency, if UE receives an offset "$Q_{offsets,n}$" between a serving cell and a neighbor cell $Q_{offset} = Q_{offsets,n}$. If UE does not $Q_{offsets,n}$, $Q_{offset} = 0$.

In Inter-frequency, if UE receives an offset "$Q_{offsets,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighbor cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures $R_s$ of a serving cell and $R_n$ of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Radio Link Monitoring (RLM) is described below.

UE monitors downlink quality based on a cell-specific reference signal in order to detect the quality of the downlink radio link of a PCell. The UE estimates the quality of a downlink radio link in order to monitor the quality of the downlink radio link of the PCell, and compares the estimated quality with threshold values Qout and Qin. The threshold value Qout is defined as a level at which a downlink radio link is unable to be stably received, which corresponds to a block error rate of 10% of hypothetical PDCCH transmission by taking into consideration a PDFICH error. The threshold value Qin is defined as a downlink radio link quality level at which a downlink radio link is able to be more stably received than compared to the level of Qout, which corresponds to a block error rate of 2% of hypothetical PDCCH transmission by taking into consideration a PDFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE.

A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
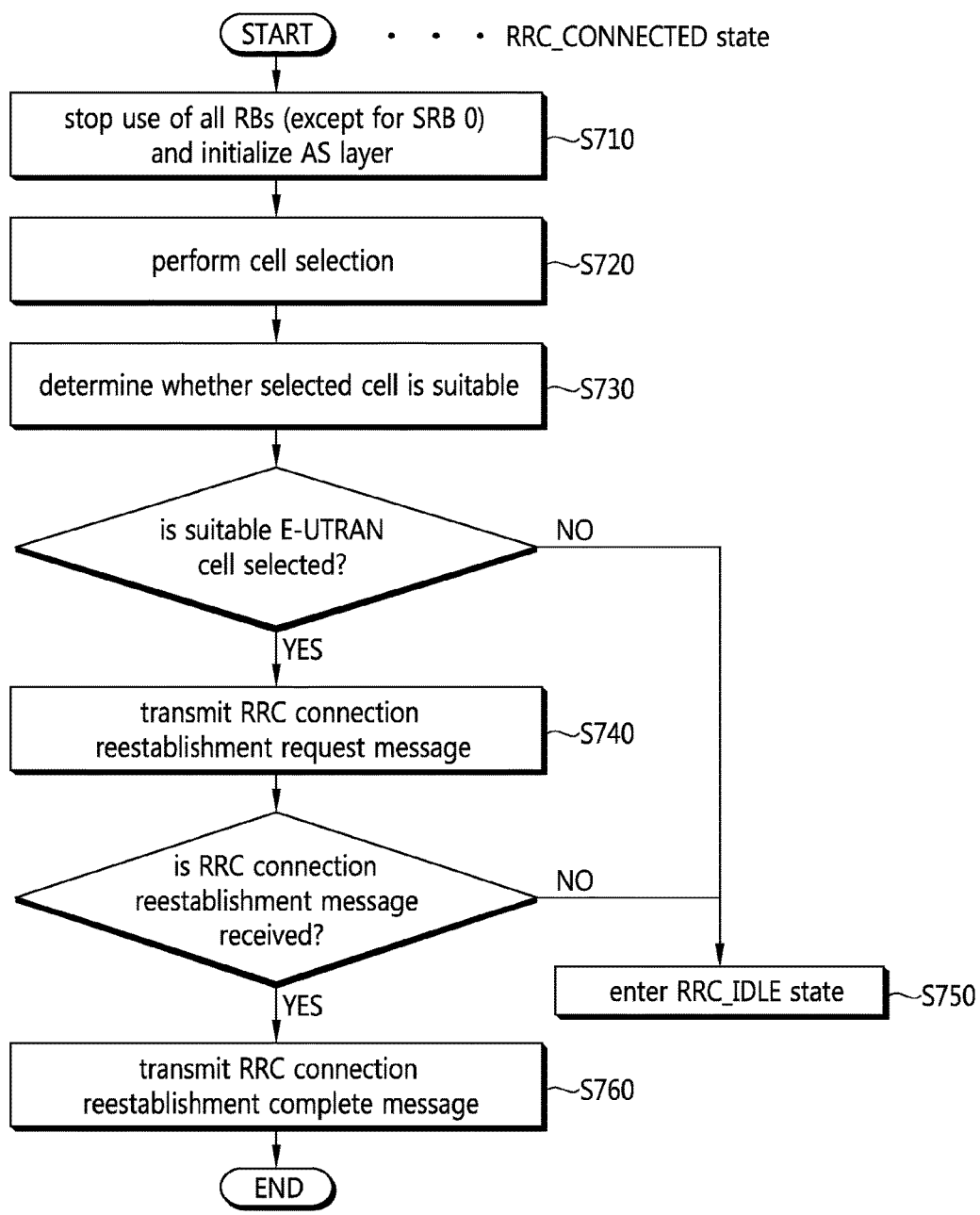
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

A report on an RLF is described below.

When an RLF occurs or a handover failure occurs, UE reports such a failure event to a network in order to support the Mobility Robustness Optimization (MRO) of the network.

After RRC connection re-establishment, the UE may provide the RLF report to the eNB. Wireless measurement includes in the RLF report may be used for a potential reason of a failure in order to identify coverage problems. Such information may be used to borrow such events as input to other algorithms by excluding the events in MRO evaluation for an intra-LTE mobility connection failure.

If RRC connection re-establishment fails or UE does not perform RRC connection re-establishment, the UE may be connected again in idle mode, and may generate a valid RLF report on an eNB. For such an object, the UE may store information related to the most recent RLF or handover failure, and may inform an LTE cell that an RLF report is valid every RRC connection (re)establishment and handover until the RLF report is fetched by a network or for 48 hours after an RLF or handover failure is detected.

The UE maintains the information for a state shift and a change of RAT, and indicates that the RLF report is valid again after returning back to LTE RAT.

In an RRC connection establishment procedure, the validity of an RLF report means that UE has experienced obstruction, such as a connection failure, and an RLF report attributable to the failure has not yet been transferred to a network. The RLF report from the UE includes the following information.

If the last cell (in the case of an RLF) that has provided service to the UE or the E-CGI of a target for handover has not been known, a PCI and frequency information are used instead.

The E-CGI of a cell at which re-establishment has been attempted.

When initializing the last handover, for example, when a message 7 (an RRC connection reconfiguration) is received by the UE, the E-CGI of a cell that has provided service to the UE.

The time that has elapsed from the initialization of the last handover to a connection failure.

Information indicative of whether the connection failure is attributable to an RLF or a handover failure.

Wireless measurements.

The location of a failure.

The eNB that has received the RLF from the UE may forward the report to an eNB that had provided service to the UE prior to the reported connection failure. Wireless measurements included in the RLF report may be used to identify coverage issues as a potential cause of an RLF. Such information may be used to send events to other algorithm as input again by excluding the events from the MRO evaluation of an intra-LTE mobility connection failure.

Measurement and a measurement report are described below.

In a mobile communication system, to support the mobility of UE is essential. Accordingly, the UE continues to measure the quality of a serving cell from which the UE is now provided with service and the quality of a neighbor cell. The UE reports measured results to a network on a proper time, and the network provides optimum mobility to the UE through handover, etc. In general, measurement for this purpose is called a Radio Resource Management (RRM) measurement.

In order to provide information that may help an operator to operate a network in addition to the mobility support object, UE may perform measurement for a specific object set by the network, and may report measured results thereof to the network. For example, UE receives the broadcast information of a specific cell that has been determined by the network. The UE may report the cell identity (this is also called a global cell identity) of the specific cell, identity information about the location to which the specific cell belongs (e.g., Tracking Area Code) and/or other pieces of cell information (e.g., whether or not it is a member of a Closed Subscriber Group (CSG) cell) to the serving cell.

If UE checks that the quality of a specific area is very poor through measurement while moving, the UE may report location information and measured results for cells having poor quality to a network. A network may perform network optimization based on the reports of the measured results of UEs that help the operation of the network.

In a mobile communication system in which frequency reuse (frequency reuse factor) is 1, mobility is chiefly performed between difference cells that belong to the same frequency band. Accordingly, in order to well guarantee the mobility of UE, the UE needs to well measure the quality of neighboring cells having the same center frequency as a serving cell and information about the cells. As described above, the measurement of a cell having the same center frequency as a serving cell is called intra-frequency measurement. UE performs intra-frequency measurement and reports measured results thereof to a network on a proper time so that the object of corresponding measured results is achieved.

A mobile communication operator may operate a network using a plurality of frequency bands. If the service of a communication system is provided through a plurality of frequency bands, in order to guarantee optimum mobility for UE, the UE needs to well measure the quality of neighboring cells having center frequencies from the center frequency of a serving cell and information about the cells. As described above, the measurement of a cell having a center frequency different from the center frequency of a serving cell is called inter-frequency measurement. UE needs to be able to perform inter-frequency measurement and to report measured results thereof to a network on a proper time.

If UE supports the measurement of a heterogeneous network, the UE may measure the cell of a heterogeneous network according to a BS configuration. The measurement of such a heterogeneous network is called inter-Radio Access Technology (RAT) measurement. For example, RAT may include an UMTS Terrestrial Radio Access Network (UTRAN) and a GSM EDGE Radio Access Network (GERAN) that comply with the 3GPP standard, and may also include CDMA 2000 systems that comply with the 3GPP2 standard.

Figure 8:
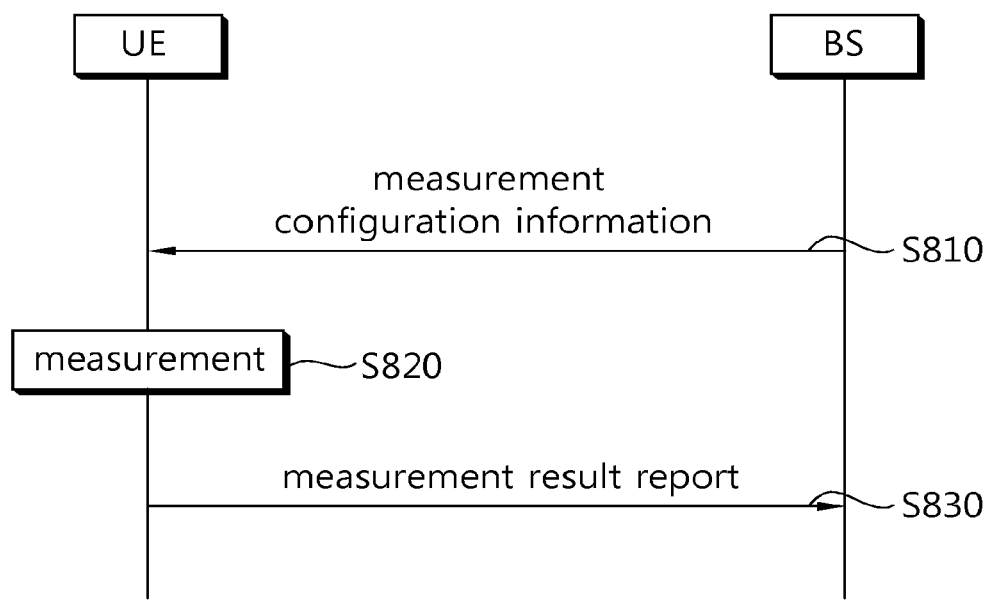
FIG. 8 is a flowchart illustrating a method of performing measurement.

FIG. 8 is a flowchart illustrating a method of performing measurement.

UE receives measurement configuration information from a BS (S810). A message including the measurement configuration information is called a measurement configuration message. The UE performs measurements based on the measurement configuration information (S820). If measured results satisfy report conditions within the measurement configuration information, the UE reports the measured results to the BS (S830). A message including the measured results is called a measurement report message.

The measurement configuration information may include the following information.

(1) Measurement object information: it is information about the object on which UE will perform measurement. A measurement object includes at least one of an intra-frequency measurement object that is the object of measurement within a cell, an inter-frequency measurement object that is the object of measurement between cells, and an inter-RAT measurement object that is the object of inter-RAT measurement. For example, the intra-frequency measurement object may indicate a neighboring cell having the same frequency band as a serving cell, the inter-frequency measurement object may indicate a neighboring cell having a frequency band different form that of a serving cell, and the inter-RAT measurement object may indicate a neighboring cell having RAT different from that of a serving cell.

(2) Reporting configuration information: this is information about report conditions regarding when UE reports measured results and a report type. The report conditions may include information about an event or cycle on which the report of the measured results is triggered. The report type is information regarding that the measured results will be configured in what type.

(3) Measurement identity information: This is information about a measurement identity that associates a measurement object with a reporting configuration so to determine when and in what type the UE will report a specific measurement object. The measurement identity information may be included in a measurement report message, and may indicate a specific measurement object for which the measurement result is obtained and a specific reporting condition according to which the measurement report is generated.

(4) Quantity configuration information: This is information about a measurement unit, a reporting unit, and/or a parameter for configuring filtering of a measurement result value.

(5) Measurement gap information: This is information about a measurement gap as a duration that can be used by the UE only for a measurement without consideration of data transmission with a serving cell because a downlink transmission or an uplink transmission is not scheduled.

In order to perform a measurement procedure, UE has a measurement object list, a measurement report configuration list, and a measurement identity list.

In 3GPP LTE, a BS may configure only one measurement object for a single frequency band in relation to UE. In accordance with Paragraph 5.5.4 3GPP TS 36.331 V8.5.0 (2009-03) "Evolved Universal Terrestrial Radio Access (E-UTRA) Radio Resource Control (RRC); Protocol specification (Release 8)," events that trigger measurement reports are defined in the following table.

TABLE 1

| Event | Report Conditions |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measured results of UE satisfy a set event, the UE sends a measurement report message to a BS.

Figure 9:
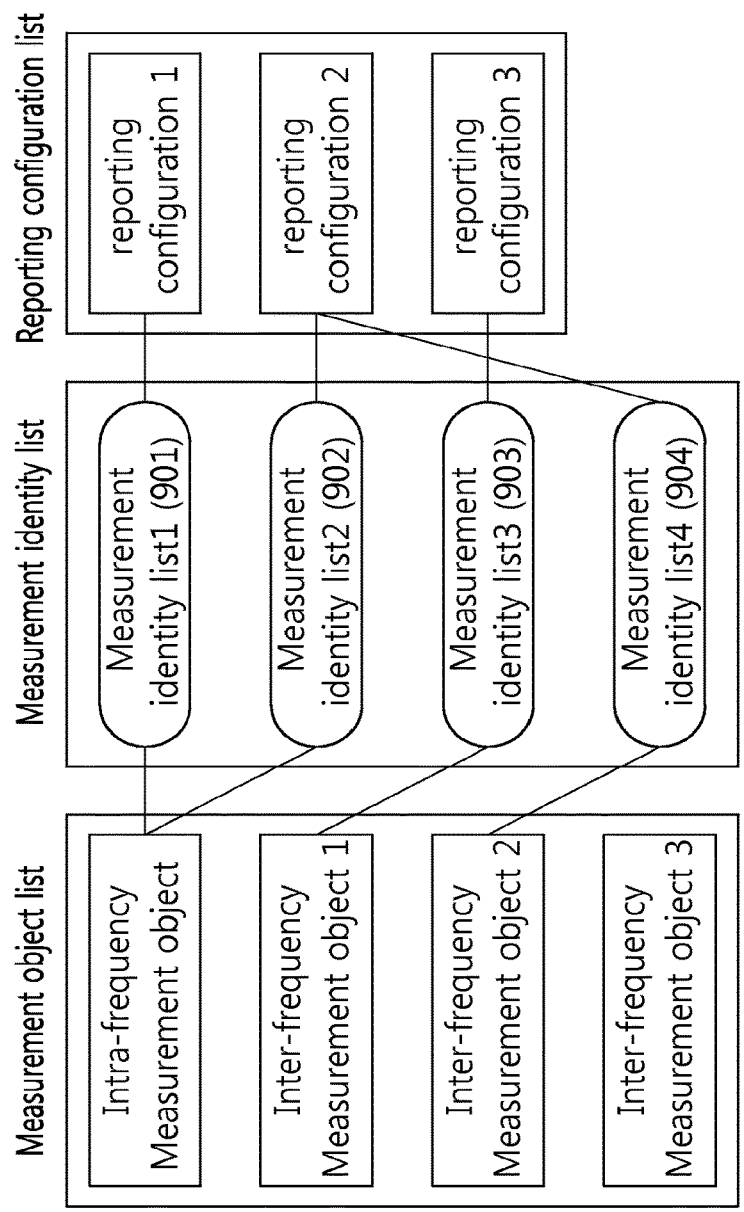
FIG. 9 illustrates an example of a measurement configuration configured to UE.

FIG. 9 illustrates an example of a measurement configuration configured to UE.

First, a measurement identity 1 901 connects an intra-frequency measurement object and a reporting configuration 1. UE performs intra-cell measurement (intra-frequency measurement), and the reporting configuration 1 is used to determine the criterion of a measurement result report and a report type.

A measurement identity 2 902 is connected to the intra-frequency measurement object like the measurement identity 1 901, but it connects the intra-frequency measurement object to a reporting configuration 2. UE performs measurement, and the reporting configuration 2 is used to determine the criterion of a measurement result report and a report type.

In accordance with the measurement identity 1 901 and the measurement identity 2 902, UE sends the measured results of the intra-frequency measurement object although the measured results satisfy any one of the reporting configuration 1 and the reporting configuration 2.

A measurement identity 3 903 connects an inter-frequency measurement object 1 and a reporting configuration 3. UE reports the measured results of the inter-frequency measurement object 1 if the measured results satisfy report conditions included in the reporting configuration 1.

A measurement identity 4 904 connects an inter-frequency measurement object 2 and the reporting configuration 2. UE reports the measured results of the inter-frequency measurement object 2 if the measured results satisfy report conditions included in the reporting configuration 2.

Meanwhile, a measurement object, a reporting configuration and/or a measurement identity may be added, changed and/or deleted. This may be indicated in such a manner that a BS sends a new measurement configuration message to UE or sends a measurement configuration change message to the UE.

Figure 10:
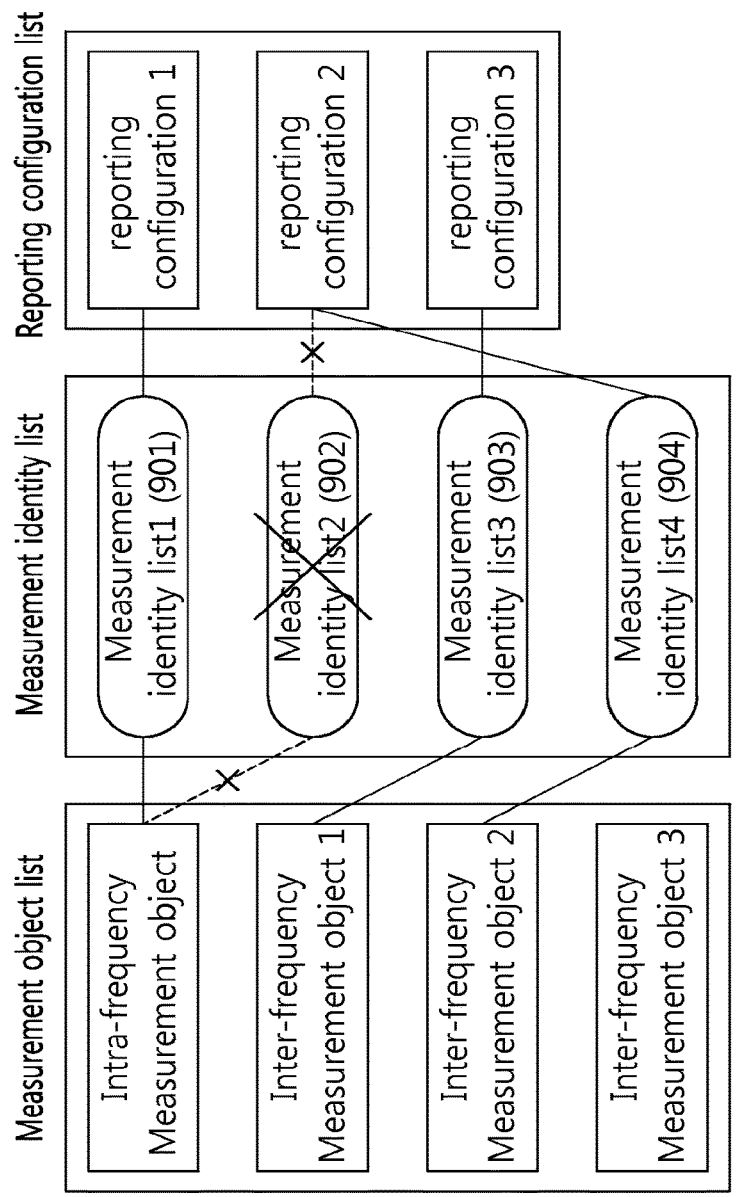
FIG. 10 illustrates an example in which a measurement identity is deleted.

FIG. 10 illustrates an example in which a measurement identity is deleted. When a measurement identity 2 902 is deleted, the measurement of a measurement object associated with the measurement identity 2 902 is stopped, and a measurement report is not transmitted. A measurement object or a reporting configuration associated with a measurement identity may not be changed.

Figure 11:
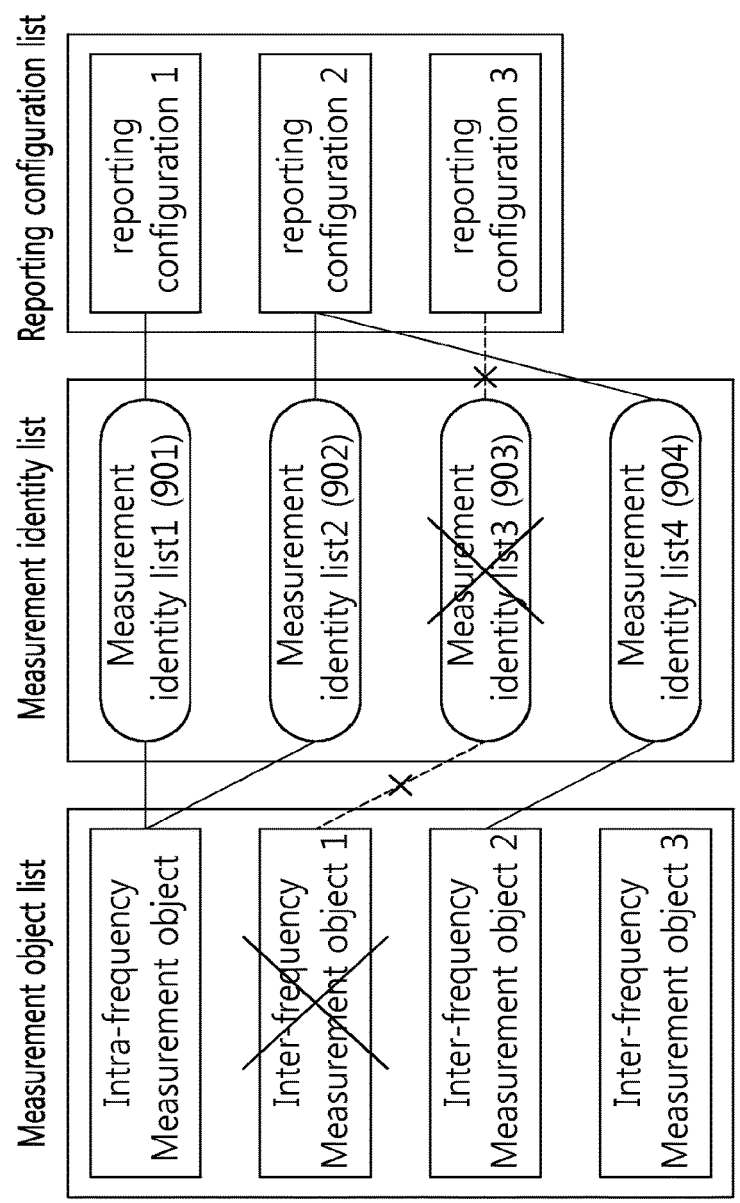
FIG. 11 illustrates an example in which a measurement object is deleted.

FIG. 11 illustrates an example in which a measurement object is deleted. When an inter-frequency measurement object 1 is deleted, UE also deletes an associated measurement identity 3 903. The measurement of the inter-frequency measurement object 1 is stopped, and a measurement report is not transmitted. However, a reporting configuration associated with the deleted inter-frequency measurement object 1 may not be changed or deleted.

When a reporting configuration is removed, UE also removes an associated measurement identity. The UE stops the measurement of a measurement object associated by the associated measurement identity. However, a measurement object associated with a deleted reporting configuration may not be changed or deleted.

A measurement report may include a measurement identity, the measured quality of a serving cell, and the measured results of a neighboring cell. A measurement identity identifies a measurement object whose measurement report has been triggered. The measured results of a neighboring cell may include the cell identity and measured quality of the neighboring cell. Measured quality may include at least one of Reference Signal Received Power (RSRP) and Reference Signal Received Quality (RSRQ).

Next, a multimedia broadcast and multicast service (MBMS) is described in detail.

A transport channel for the MBMS, that is, an MCH channel, may be mapped to a logical channel, e.g., an MCCH channel or an MTCH channel. The MCCH channel transmits an MBMS-related RRC message, and the MTCH channel transmits a traffic of a specific MBMS service. One MCCH channel exists in every one MBMS single frequency network (MBSFN) region for transmitting the same MBMS information/traffic. When a plurality of MBSFN regions are provided in one cell, a UE may receive a plurality of MCCH channels. If the MBMS-related RRC message is changed in a specific MCCH channel, a PDCCH channel transmits an MBMS radio network temporary identity (M-RNTI) and an indication for indicating the specific MCCH channel. The UE which supports the MBMS may receive the M-RNTI and the MCCH indication through the PDCCH channel, may recognize that the MBMS-related RRC message is changed in the specific MCCH channel, and may receive the specific MCCH channel. The RRC message of the MCCH channel may be changed in each modification period, and is broadcast repetitively in each repetition period.

The UE may receive a dedicated service during the MBMS service is provided. For example, a certain user may use a smart phone carried by the user to watch a TV through the MBMS service, and simultaneously may use the smart phone to perform chatting through an instant messaging (IM) service such as MSN or Skype. In this case, the MBMS service is provided through an MTCH received by several UEs together, and a service provided individually to each UE, such as the IM service, is provided through a dedicated bearer such as DCCH or DTCH.

In one region, a certain BS may use several frequencies simultaneously. In this case, in order to effectively use a radio resource, the network may select one of the several frequencies to provide the MBMS service at only the selected frequency, and may provide a dedicated bearer to each UE at all frequencies.

In this case, if a UE to which a service is provided by using the dedicated beater at a frequency at which the MBMS service is not provided intends to receive the MBMS service, the UE needs to perform a handover to a frequency at which the MBMS is provided. For this, the UE provides an MBMS interest indication to the BS. That is, if it is intended to receive the MBMS service, the UE transmits the MBMS interest indication to the BS. When the indication is received, the BS recognizes that the UE intends to receive the MBMS service, and thus move the UE to a frequency at which the MBMS is provided. Herein, the MBMS interest indication implies information indicating that the UE intends to receive the MBMS service, and additionally includes information regarding a specific frequency to which frequency the UE intends to move.

A UE which intends to receive a specific MBMS service first recognizes broadcast time information and frequency information used to provide the specific service. If the MBMS service is already being broadcast or is to be broadcast soon, the UE sets a priority of a frequency at which the MBMS service is provided to a highest priority. The UE uses reconfigured frequency priority information to perform a cell reselection procedure, and thus moves to a cell for providing the MBMS service and receives the MBMS service.

If the UE is currently receiving the MBMS service or is interested in receiving it and if the UE can receive the MBMS service during it camps on at a frequency at which the MBMS service is provided, it can be considered that a top priority is applied to a corresponding frequency during one MBMS session in which the following cases is maintained in a situation where SIB13 is being broadcast in a reselected cell.

In a case where SIB15 of a serving cell indicates that one or more MBMS service area identities (SAIs) are included in a user service description (USD) of a corresponding service.

In a case where SIB15 is not broadcast in a serving cell and a corresponding frequency is included in USD of a corresponding service.

Hereinafter, in-device coexistence (IDC) will be described.

In order for a user to access various networks anytime anywhere, one UE may be equipped with a global navigation satellite system (GNSS) receiver in addition to a transceiver for a wireless communication system such as LTE, WiFi, Bluetooth (BT), etc. For example, there may be a UE equipped with LTE and BT modules to receive a VoIP service and a multimedia service by using a BT device, a UE equipped with LTE and WiFi modules for traffic distribution, a UE equipped with GNSS and LTE modules to additionally acquire location information, etc.

In the aforementioned case, since several transceivers are located close to each other in one UE, there may be case where transmission power of one transmitter is greater than reception power of another receiver. By using a filter technique or by providing an interval in a frequency in use, an occurrence of an IDC interference between two transceivers can be prevented. However, when several wireless communication modules operate in adjacent frequencies in one UE, an interference cancellation cannot be sufficiently performed with a current filter technique. In the future, there is a need to solve the aforementioned problem in order for transceivers for a plurality of wireless communication modules to coexist in a UE.

Figure 12:
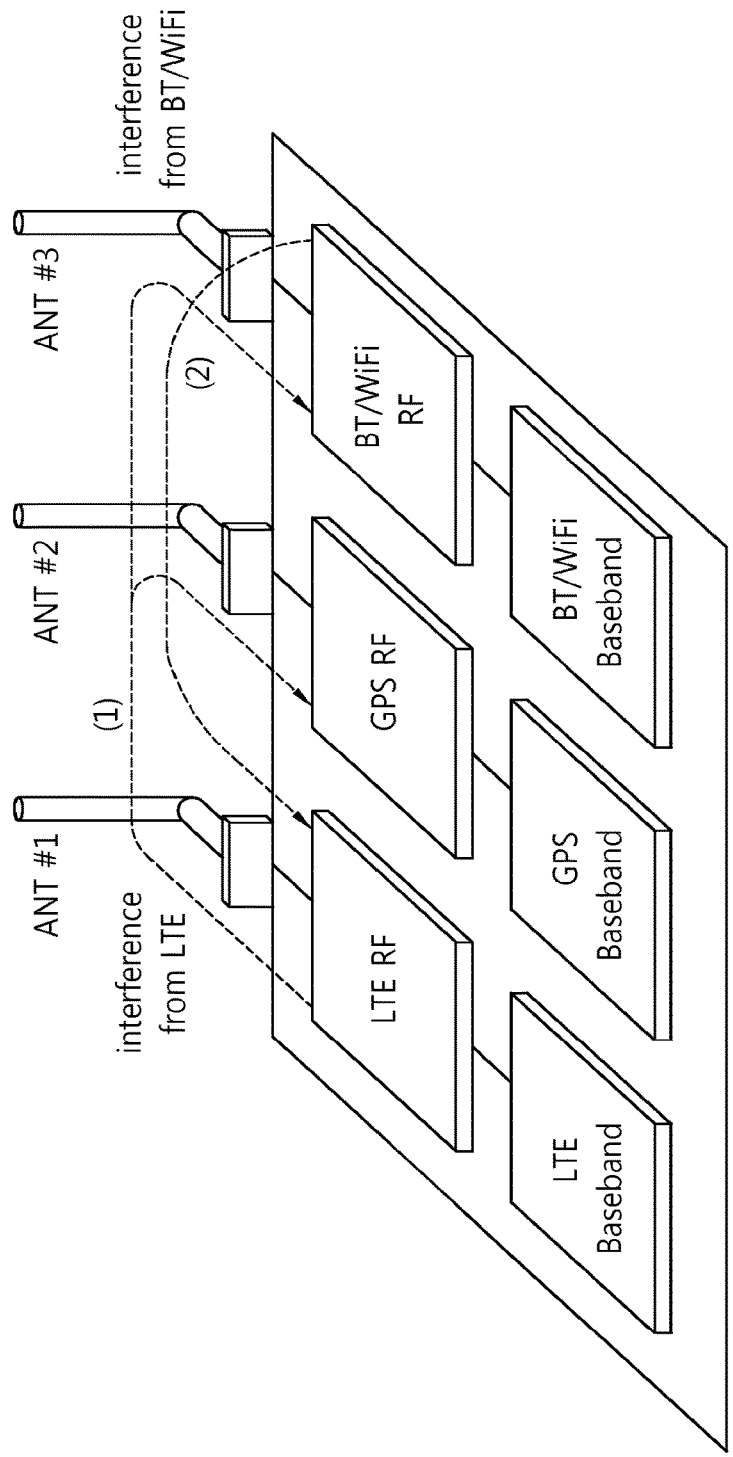
FIG. 12 shows a situation where a mutual interference can occur in an IDC environment where LTE, GPS, and BT/WiFi coexist in one UE.

FIG. 12 shows a situation where a mutual interference can occur in an IDC environment where LTE, GPS, and BT/WiFi coexist in one UE.

An IDC interference avoidance can be roughly classified into three types according to whether there is a coordination between an LTE module and another coexisting communication module and whether there is a coordination between the LTE module and a BS to solve an IDC interference. A first mode is a mode in which there is no coordination between the LTE module and a network for the IDC interference avoidance. In this case, since the LTE module does not know information regarding another coexisting communication module, a service quality deterioration caused by the IDC interference may not be properly handled. A second mode is a mode in which there is a coordination between coexisting communication modules in a UE. In this mode, an on/off state, traffic transmission state, etc., of a peer module can be known between coexisting modules. However, there is no coordination between the UE and the network in this mode. A last mode is a mode in which not only a coordination between coexisting modules in the UE but also a coordination between the UE and the network exists. In this mode, the coexisting module can know an on/off state, traffic transmission state, etc., of a peer module. In addition, the UE reports an IDC interference state to the network, so that the network determines to avoid the IDC interference and takes an action for this.

The LTE module may measure the IDC interference not only through a coordination with another module in the UE as described above but also through an inter/intra frequency measurement.

The interference may be the IDC interference which occurs when different communication modules coexist and operate in one UE, and the IDC interference may occur in the following coexistence situation.

The interference occurs in a situation where LTE and WiFi coexist.

The interference occurs in a situation where LTE and BT coexist.

The interference occurs in a situation where LTE and GNSS coexist.

In terms of a frequency, the communication modules operate in adjacent frequencies as follows and thus may cause a mutual interference.

LTE TDD may operate at Band 40 (2300 MHz~2400 MHz), and WiFi and BT may operate at an unlicensed band (2400 MHz~2483.5 MHz). In this case, a transmission of LTE may cause an interference to WiFi and BT, and a transmission of WiFi or BT may cause an interference to a reception of LTE.

LTE FDD may perform an uplink transmission at Band 7 (2500 MHz~2700 MHz), and WiFi and Bluetooth may operate at an unlicensed band (2400 MHz~2483.5 MHz). In this case, the uplink transmission of LTE may cause an interference to a reception of WiFi or Bluetooth.

LTE FDD may perform an uplink transmission at Band 13 (UL: 777-787 MHz, DL: 746-756 MHz) or Band 14 (UL: 788-798 MHz, DL: 758-768 MHz), and GPS radio may perform a reception at 1575.42 MHz. In this case, the uplink transmission of LTE may cause an interference to a reception of GPS.

At present, 3GPP considers roughly two schemes to solve the IDC interference. A first scheme is frequency division multiplexing (FDM) in which an interfering communication module and an interfered communication module change a frequency. A second scheme is time division multiplexing (TDM) in which one frequency is used by coexisting communication modules in a time division manner.

A UE may transmit an IDC indication to a network upon sensing an internal interference between an LTE device in the UE and another ISM band device in the UE, that is, an IDC interference. The IDC indication may indicate that the UE experiences the IDC interference. The IDC indication may include information regarding a specific frequency and/or a time duration pattern. Herein, the specific frequency information may be used as a basis for performing FDM to solve the IDC interference problem, and the information regarding the specific time duration pattern may be used as a basis for performing TDM. The specific frequency information may indicate a frequency at which the IDC interference occurs, and the specific time duration pattern information may indicate a time duration in which the IDC interference occurs due to an operation of another ISM band device.

Hereinafter, an enhancement diversity of data application (EDDA) and a power preference indication will be described.

Due to a diversity of a data application which is running in a UE side, an optimized configuration may be difficult in terms of UE power and UE performance. This is because a network cannot completely recognize a state for an application which is running on the UE. To compensate for this, a wireless communication system allows the UE to be able to transmit to the network an indication indicating a preference on a 'default' (in terms of power saving) discontinuous reception (DRX) configuration or a "low power consumption" DRX configuration. Such an indication is called a 'power preference indication'. The power preference indication may be configured to indicate whether the UE prefers a preferentially optimized configuration for the power saving.

The network may receive the power preference indication, and according thereto, may configure a parameter related to an operation of the UE and may provide it to the UE. Upon receiving the power preference indication indicating a preference on a preferentially optimized configuration for the power saving, the network may set a long DTX to the UE or may allow the UE to enter an IDLE state. Until the power preference indication explicitly indicating the preference of the preferentially optimized configuration for the power saving is received, the network may operate by considering that the UE does not prefer to operate the power saving.

If a UE-originated indication such as the aforementioned IDC indication, MBMS interest indication, and power preference indication is frequently transmitted, an efficiency of a network operation is decreased, and a service to be provided to the UE may deteriorate. To restrict a frequent transmission of the UE-originated indication, a prohibit timer is proposed. The prohibit timer may specify a time at which the UE-originated indication cannot be transmitted again from a time at which the UE transmits the UE-originated indication. Hereinafter, a signaling method related to the UE-originated indication will be described.

Figure 13:
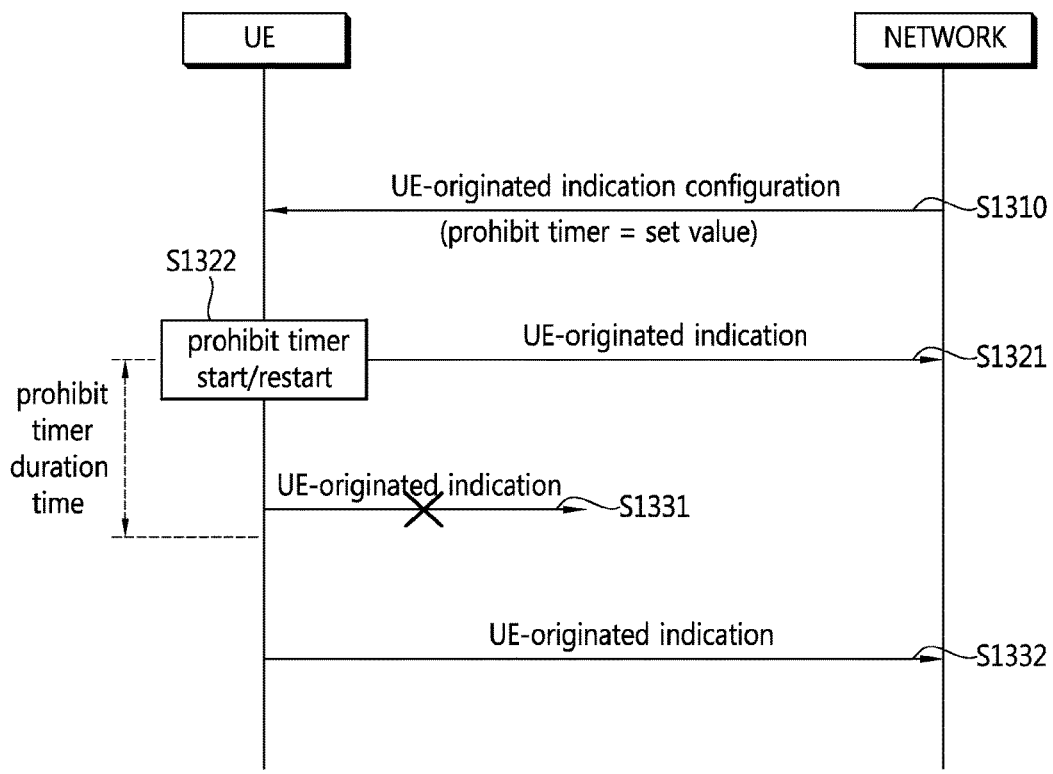
FIG. 13 is a flowchart showing a UE-originated indication signaling method according to an embodiment of the present invention.

FIG. 13 is a flowchart showing a UE-originated indication signaling method according to an embodiment of the present invention.

Referring to FIG. 13, a network transmits a UE-originated indication configuration to a UE (step S1310). The UE-originated indication configuration may enable a transmission of the UE-originated indication transmission of the UE or may trigger the UE-originated indication transmission.

The UE-originated indication configuration may allow the UE to be able to transmit an IDC indication and/or a power preference indication. In this case, the UE-originated indication configuration may be transmitted by being included in an RRC connection configuration message, an RRC connection reconfiguration message, and/or a handover indication message.

The UE-originated indication configuration is for reporting that an MBMS service is provided, and may be for triggering the UE to transmit an MBMS interest indication. In this case, the UE-originated indication configuration may be transmitted by being included in system information.

The UE-originated indication configuration may include information indicating a set value of a prohibit timer which runs when the UE-originated indication is transmitted.

The UE-originated indication configuration may be transmitted independent of several types of UE-originated indications. For example, an IDC indication configuration for an IDC indication, a power preference indication configuration for a power preference indication, and an MBMS interest indication configuration for an MBMS interest indication may be transmitted by being created individually. In this case, the prohibit timer set value may be set individually for each type of UE-originated indication.

The UE-originated indication configuration may be commonly transmitted for several types of UE-originated indications. In this case, the UE-originated indication configuration may include an individual prohibit timer value based on each UE-originated indication or may include a prohibit timer set value commonly applied to the several types of UE-originated indications.

The UE transmits the UE-originated indication to the network (step S1321), and starts and/or restarts the prohibit timer (step S1322).

If the UE-originated indication is an IDC indication, the UE may transmit the IDC indication by including it to an IDC indication message.

If the UE-originated indication is an MBMS interest indication, the UE may transmit an MBMS interest indication by including it to an MBMS interest indication message.

If the UE-originated indication is a power preference indication, the UE may transmit the power preference indication by including it to a UE assistance information message. The UE interest indication may indicate whether the UE is interested in a power saving operation or a normal operation.

In the operation of the prohibit timer related to the transmission of the power preference indication, the prohibit timer may be configured to start and/or restart by a power preference indication transmission only for a case where the power preference indication indicates a preference on the normal operation. If the power preference indication indicates a preference on the power saving operation, the UE may not start and/or restart the prohibit timer even if the power preference indication is transmitted.

The prohibit timer driven by the UE may be driven by being set to the prohibit timer set value included in the UE-originated indication configuration. Although one prohibit timer is driven herein as an example of a single UE-originated indication, the embodiment of the present invention is not limited thereto. If an individual prohibit timer is supported for each type of UE-originated indication, an individual prohibit timer corresponding to the UE-originated indication may be driven.

For example, if the UE transmits the IDC indication, the UE may start and/or restart the prohibit timer for the IDC indication. Each of the individual prohibit timers may be set to a different value.

For another example, if a common prohibit timer is set for several types of UE-originated indications, the UE starts and/or restarts a prohibit timer which is set to the same value irrespective of a type of UE-originated indication to be transmitted.

A time of starting/restarting the prohibit timer may be immediately after the UE-originated indication is transmitted or when the UE-originated indication is transmitted, or may be before the UE-originated indication is transmitted or during a configuration for transmitting the UE-originated indication. Although it is described hereinafter that the prohibit timer starts/restarts in association with a transmission of the UE-originated indication, the time of starting/restarting the prohibit timer may be interpreted as various time points as described above. The time of starting/restarting the prohibit timer may be based on a UE implementation.

The UE does not transmit the UE-originated indication in a duration in which the prohibit timer runs (step S1331). The UE may transmit the UE-originated indication after the prohibit timer expires (step S1332).

In the method of transmitting the power preference indication related to the running of the prohibit timer, the UE may transmit the power preference indication when the UE is configured to transmit the power preference indication but does not transmit the UE assistance information message including the power preference indication. In addition, even after the prohibit timer expires, if the power preference indication is different from what is indicated by the power preference indication included in the recently transmitted UE assistance information message, the UE may transmit the power preference indication by including it to the UE assistance information message.

If a prohibit timer based on each type of UE-originated indication is defined, the UE does not transmit the related UE-originated indication only for a case where the prohibit timer is running. On the other hand, if a prohibit timer to be commonly applied to several types of UE-originated indications is defined, the UE may not transmit any UE-originated indication when the prohibit timer runs.

In a situation where the UE transmits the UE-originated indication and the prohibit timer is running, the UE may newly acquire the UE-originated indication configuration during an RRC connection-related procedure and/or a handover procedure. In this case, a method of handling the prohibit timer which is already running may have a problem.

In addition, a network may reconfigure an operation method of a UE, or the UE may move to a target cell through a handover or the UE may perform an RRC connection re-establishment with the network. During the aforementioned procedure is performed and after the aforementioned procedure is complete, there is a need to propose a detailed operation method of the UE in association with an operation of a prohibit timer and a transmission of a UE-originated indication.

Hereinafter, a signaling method related to a UE-originated indication will be described in detail according to an embodiment of the present invention.

1. If an RRC connection reconfiguration message including a UE-originated indication configuration is received: A UE may transmit the UE-originated indication and may run a prohibit timer based thereon. When the UE receives the RRC connection reconfiguration message, a new UE-originated indication configuration may be included in the RRC connection reconfiguration message. In this case, the UE may operate as follows.

a) If the UE-originated indication configuration is acquired by receiving the RRC connection reconfiguration message, the UE may immediately restart the running prohibit timer. If the newly acquired UE-originated indication configuration includes a prohibit timer value, the UE may restart the prohibit timer by setting the prohibit timer value to an indicated new value. If the newly acquired UE-originated indication configuration does not include the prohibit timer value, the UE may restart the prohibit timer by setting the prohibit timer value to the old value.

b) If the UE-originated indication configuration is acquired by receiving the RRC connection reconfiguration message, the UE may continuously run the running prohibit timer. If the previously running prohibit timer expires, the UE may newly restart the prohibit timer immediately after the timer expires. If the newly acquired UE-originated indication configuration includes a prohibit timer value, the UE may restart the prohibit timer by setting the value of the restarted prohibit timer to an indicated new value. If the newly acquired UE-originated indication configuration does not include the prohibit timer value, the UE may restart the prohibit timer by setting the value of the restarted prohibit timer to the old value.

c) If the UE-originated indication configuration is acquired by receiving the RRC connection reconfiguration message, the UE may stop the running prohibit timer.

According to the aforementioned operation of the UE, the UE may transmit the UE-originated indication when the prohibit timer expires/stops.

2. If the UE performs a handover: If the UE performs the handover during the prohibit timer is running, the UE may operate as follows.

(1) If the handover indication message does not include the UE-originated indication configuration.

a) The UE may continuously run the previously running prohibit timer during the handover is performed and even after the handover ends. The UE may transmit the UE-originated indication when the prohibit timer expires during the handover is performed or after the handover ends.

b) The UE may restart the prohibit timer immediately when the handover indication message is received. The value of the prohibit timer to be restarted may be set to the old prohibit timer value.

c) The UE may stop the prohibit timer immediately when the handover indication message is received. Further, the UE may restart the prohibit timer after the handover is complete. Even if the prohibit timer stops during the handover, the UE assumes that the prohibit timer is running. That is, the UE does not transmit the UE-originated indication during the handover.

(2) If the handover indication message includes the UE-originated indication configuration.

a) If the UE-originated indication configuration is acquired by receiving the handover indication message, the UE may immediately restart the running prohibit timer. If the newly acquired UE-originated indication configuration includes the prohibit timer value, the UE may restart the prohibit timer by setting the prohibit timer value to an indicated new value. If the newly acquired UE-originated indication configuration does not include the prohibit timer value, the UE may restart the prohibit timer by setting the prohibit timer value to the old value.

b) If the UE-originated indication configuration is acquired by receiving the handover indication message, the UE may continuously run the running prohibit timer. If the previously running prohibit timer expires, the UE may newly restart the prohibit timer immediately after the timer expires. If the newly acquired UE-originated indication configuration includes a prohibit timer value, the UE may run the prohibit timer by setting the value of the restarted prohibit timer to an indicated new value. If the newly acquired UE-originated indication configuration does not include the prohibit timer value, the UE may run the prohibit timer by setting the value of the restarted prohibit timer to the old value.

c) If the UE-originated indication configuration is acquired by receiving the handover indication message, the UE may stop the running prohibit timer.

3. If an RRC connection is re-established: If the UE re-establishes the RRC connection with a network for such a reason as a radio link failure, a discussion about an operation of the UE related to a prohibit timer and a UE-originated indication transmission may be necessary.

(1) If the old prohibit timer is running.

a) The UE stops the prohibit timer immediately when the RRC connection re-establishment procedure starts. A time of stopping the prohibit timer may be when the UE transmits an RRC connection re-establishment request message to a network or a time at which the RRC connection re-establishment message is received from the network. Even if the prohibit timer is not running, the UE does not transmit the UE-originated indication.

b) The UE continuously runs the old prohibit timer during the RRC connection re-establishment procedure and even after the RRC connection re-establishment procedure is complete. The UE may not transmit the UE-originated indication during the prohibit timer is running.

c) The UE may restart the prohibit timer immediately when the RRC connection re-establishment procedure starts. A set value of the prohibit time to be restarted may be the same as a value of the old prohibit timer. In a case where the RRC connection re-establishment message is received and the prohibit timer restarts, if the prohibit timer set value is included in the RRC connection re-establishment message, the prohibit timer may restart by being set to the included value.

d) When the RRC connection re-establishment procedure starts, the UE may stop the running prohibit timer. If the previously running prohibit timer expires, the UE may restart the prohibit timer immediately after the timer expires. Even if the prohibit timer stops during the RRC connection re-establishment procedure, the UE assumes that the prohibit timer is running. That is, the UE does not transmit the UE-originated indication during the handover.

(2) If the prohibit timer is not running.

When the RRC connection re-establishment procedure starts, the UE may not transmit the UE-originated indication.

Hereinafter, an embodiment of the present invention will be described in detail with reference to the accompanying drawings.

Figure 14:
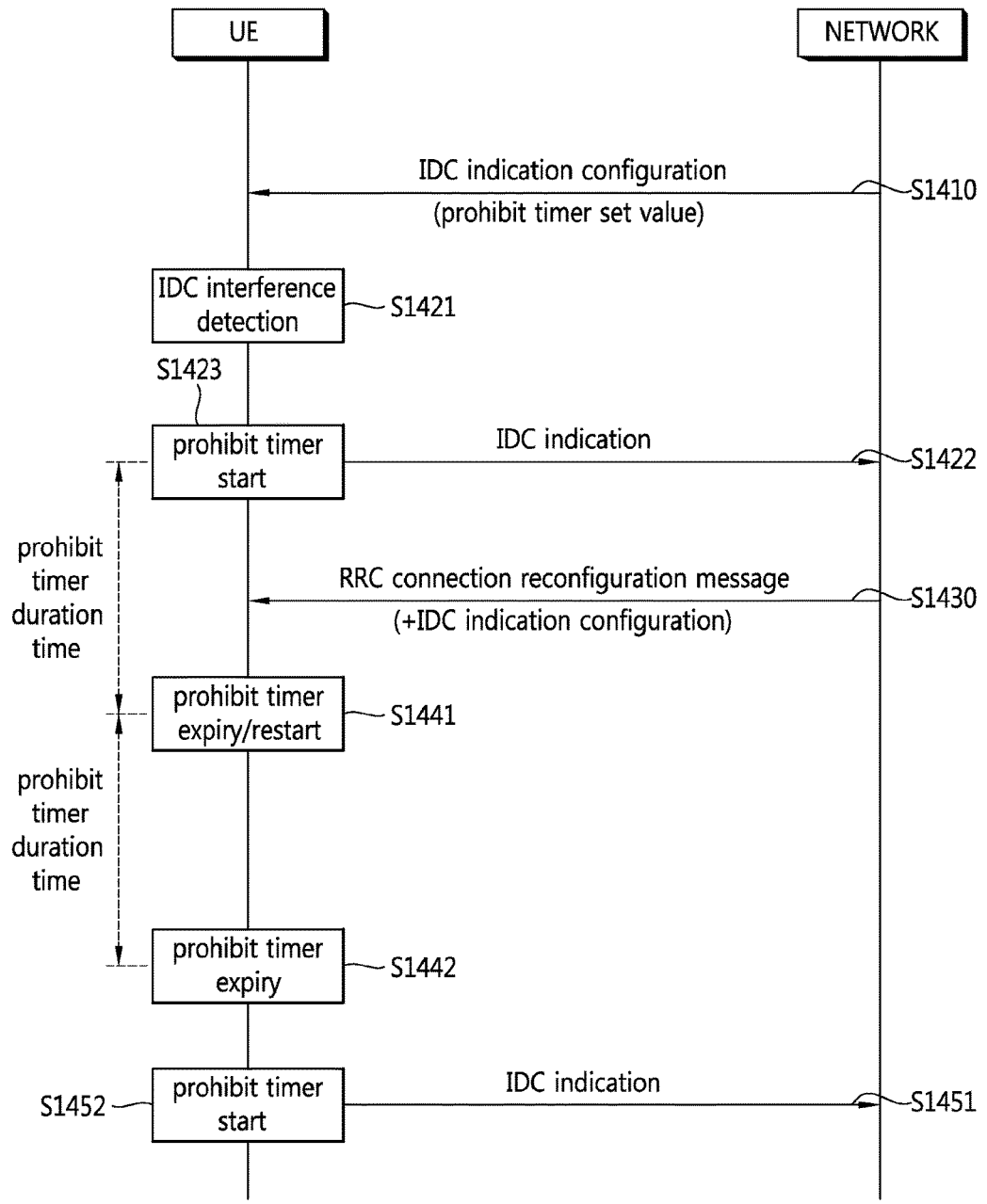
FIG. 14 shows an example of a UE-originated indication signaling method according to an embodiment of the present invention.

FIG. 14 shows an example of a UE-originated indication signaling method according to an embodiment of the present invention.

The example of FIG. 14 shows an example of a signaling method related to an IDC indication transmission of a UE.

Referring to FIG. 14, the UE receives an IDC indication configuration from a network (step S1410). The IDC indication configuration may indicate that the IDC indication transmission of the UE is allowed. The IDC indication configuration may include autonomous exclusion pattern information for a low-interference operation of the UE in response to sensing of an IDC interference. The IDC indication configuration may include information indicating a set value of a prohibit timer which may start/restart when the UE transmits the IDC indication.

The UE senses that the IDC interference occurs (step S1421), and transmits the IDC indication to the network (step S1422). Upon transmitting the IDC indication, the UE starts the prohibit timer (step S1423). The prohibit timer may be set to a value indicated by information included in the IDC indication configuration.

During the prohibit timer is running, the UE receives an RRC connection reconfiguration message including the IDC indication configuration (step S1430). The RRC connection reconfiguration message may include the IDC indication configuration.

Even if a new IDC indication configuration is received, the UE persistently runs the previously running prohibit timer. When the old prohibit timer expires, the UE restarts the prohibit timer (step S1441). A value of the newly started prohibit timer may be set to the same value as the old prohibit timer. If an IDC configuration newly acquired through step S1430 includes information indicating a prohibit timer set value, the value of the newly started prohibit timer may be set to an indicated value. The restarted prohibit timer expires when a time based on the set value is over (step S1441).

When the prohibit timer expires, the UE may transmit the IDC indication to the network upon sensing the IDC interference (step S1451). The UE may start the prohibit timer according to a transmission of the IDC indication (step S1452).

Figure 15:
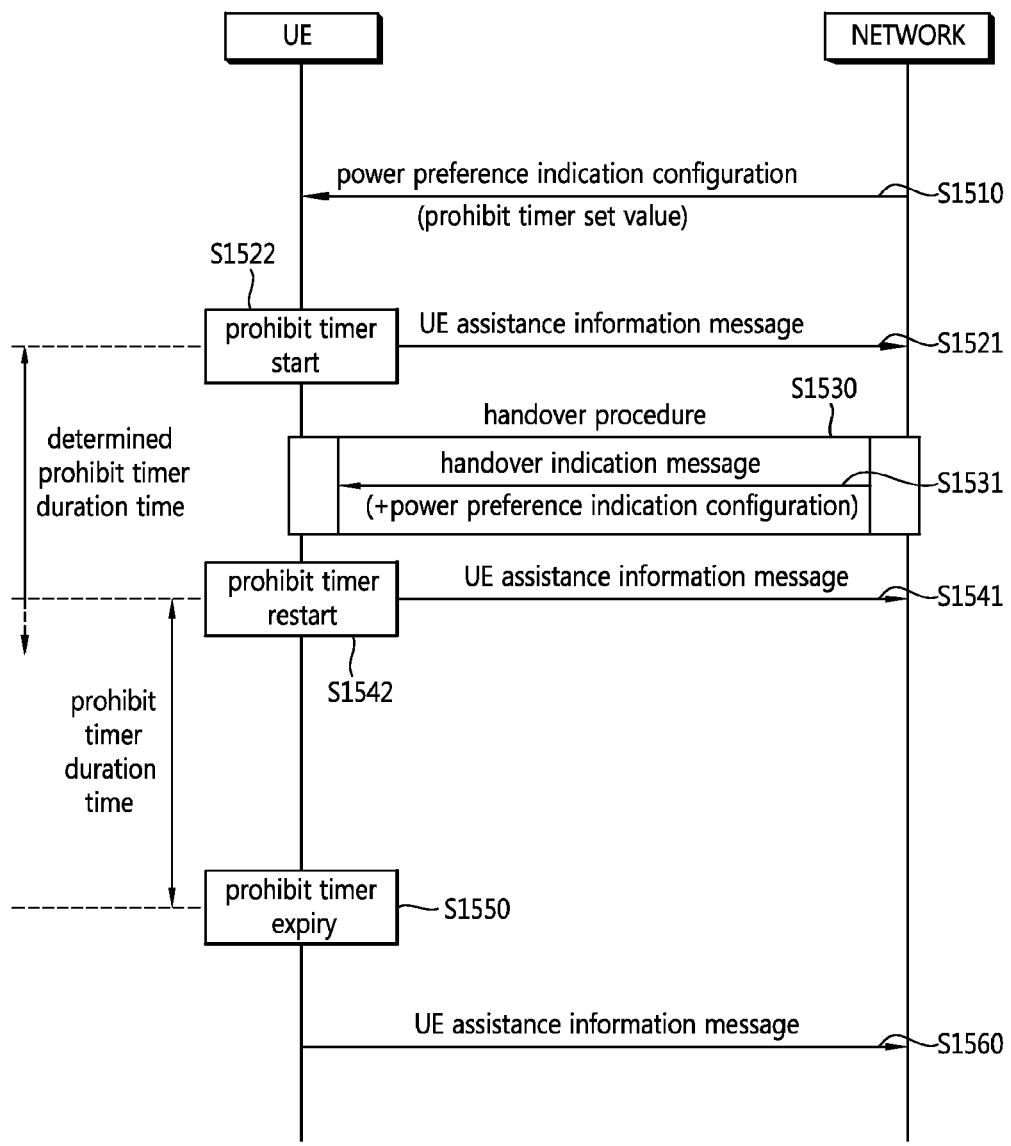
FIG. 15 shows another example of a UE-originated indication signaling method according to an embodiment of the present invention.

FIG. 15 shows another example of a UE-originated indication signaling method according to an embodiment of the present invention.

The example of FIG. 15 shows an example of a signaling method related to a power preference indication transmission of a UE.

Referring to FIG. 15, the UE receives a power preference indication configuration from a network (step S1510). The power indication configuration may indicate that the power indication transmission is allowed. The power preference indication configuration may include information indicating a set value of a prohibit timer which may start/restart when the UE transmits the power preference indication.

The UE transmits a UE assistance information message including the power preference indication (step S1521), and starts the prohibit timer (step S1522). The UE acquires the power preference indication configuration, and the UE assistance information message may be transmitted since the UE has never transmitted a UE assistance information message including the power preference indication. The UE may transmit the power preference indication by configuring to indicate a preference on a normal operation, and may restart the prohibit timer according thereto.

The UE may perform a handover during the prohibit timer is running (step S1530). The UE receives a handover indication message from the network (step S1531). The handover indication message may be an RRC connection reconfiguration message including movement control information. The handover indication message may include a power preference indication configuration.

After the handover procedure is complete, the UE transmits a UE assistance information message including the power preference indication to the network (step S1541), and restarts the prohibit timer (step S1542). The transmission of the UE assistance information message after the handover procedure may be related to a previous UE assistance information message transmission time. That is, if a time at which the UE transmits the UE assistance information message in step S1521 corresponds to a specific time duration prior to a time of receiving a handover indication message, the UE may transmit the UE assistance information message including the power preference indication after the handover ends. The specific time duration may be 1 second before a time of receiving the handover indication message.

The power preference indication of the UE assistance information message transmitted by the UE may indicate a preference on a normal operation. Accordingly, the prohibit timer may restart. If the power preference indication of the UE assistance information message transmitted by the UE indicates a preference on a power saving operation, the UE may not restart the prohibit timer.

A value of the restarted prohibit timer may be set to the same value as the old prohibit timer. If the power preference indication configuration newly acquired through step S1531 includes information indicating the prohibit timer set value, the value of the restarted prohibit timer may be set to an indicated value.

The restarted prohibit timer expires when a time based on the set value is over (step S1550).

If the prohibit timer expires, the UE may transmit the UE assistance information message including the power preference indication (step S1560). The power preference indication may indicate a preference on an operation scheme different from what is indicated by the power preference indication transmitted in step S1541. For example, if the power preference indication transmitted in step S1541 indicates a preference on a normal operation, a power preference indication transmitted in step S1560 may indicate a preference on a power saving operation. In this case, although the UE assistance information message is transmitted in step S1560, the UE may not start/restart the prohibit timer.

Figure 16:
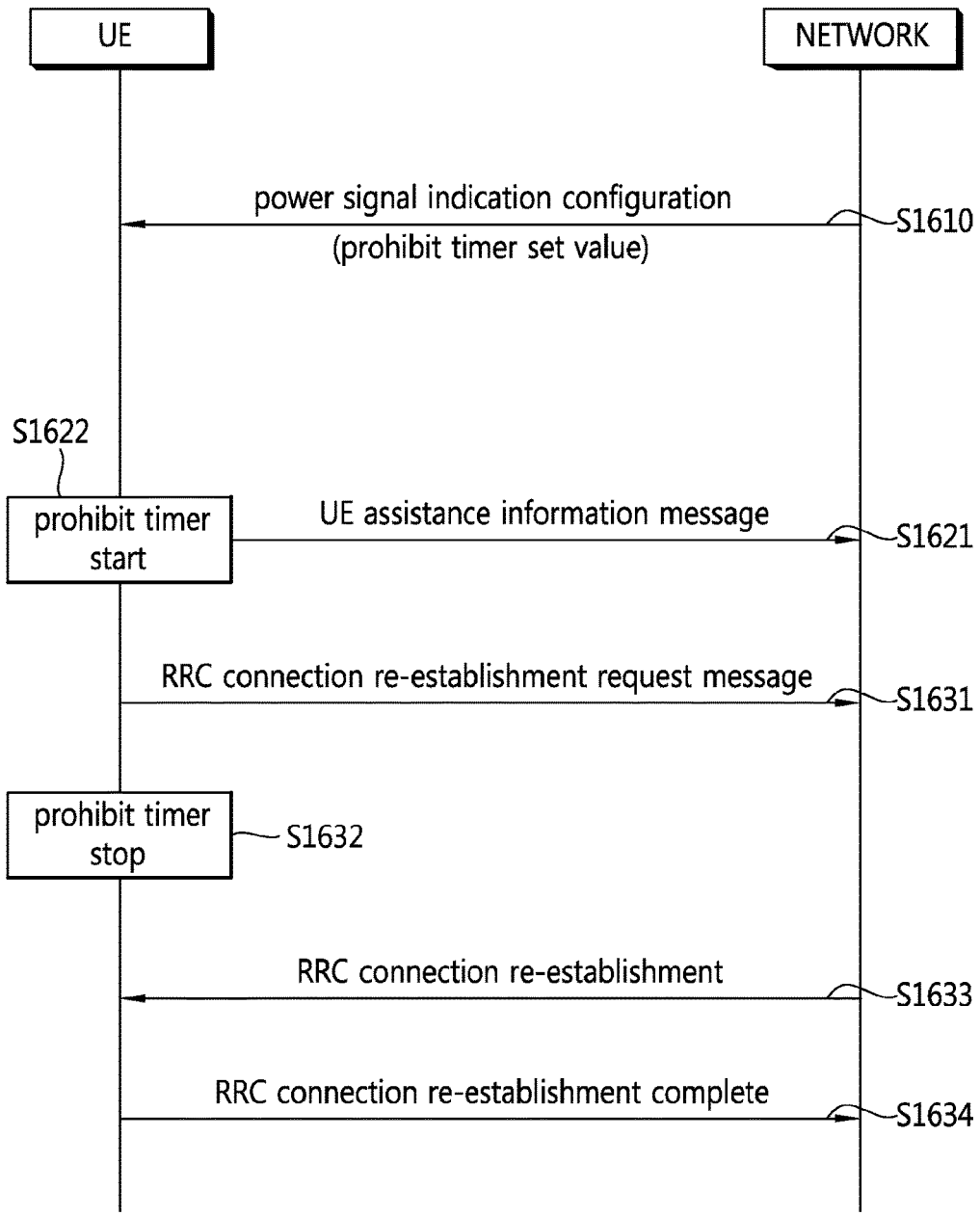
FIG. 16 is a flowchart showing another example of a UE-originated indication signaling method according to an embodiment of the present invention.

FIG. 16 is a flowchart showing another example of a UE-originated indication signaling method according to an embodiment of the present invention.

The example of FIG. 16 shows an example of a signaling method related to a power preference indication transmission of a UE.

Referring to FIG. 16, the UE receives a power preference indication configuration from a network (step S1610). The power indication configuration may indicate that the power indication transmission is allowed. The power indication configuration may include information indicating a value of a prohibit timer which may start/restart when the UE transmits the power preference indication.

The UE transmits a UE assistance information message including the power preference indication (step S1621), and starts the prohibit timer (step S1622). The UE acquires the power preference indication configuration, and the UE assistance information message may be transmitted since the UE has never transmitted a UE assistance information message including the power preference indication. The UE may transmit the power preference indication by configuring to indicate a preference on a normal operation, and may restart the prohibit timer according thereto.

During the prohibit timer is running, an RRC connection re-establishment may be required due to such a reason as a radio link failure. In this case, the UE may perform the RRC connection re-establishment procedure to recover a link with the network.

The UE starts the RRC connection re-establishment procedure by transmitting the RRC connection re-establishment request message to the network (step S1631). When the RRC connection re-establishment procedure starts, the UE stops the running prohibit timer (step S1632). In addition, the UE may release a power preference indication configuration configured to the UE. Accordingly, a power preference indication transmission of the UE may be impossible when the RRC connection re-establishment procedure starts.

Thereafter, the RRC connection re-establishment message is received from the network (step S1633), and the RRC connection re-establishment complete message is transmitted to the network (step S1634). Therefore, the RRC connection re-establishment procedure can be complete.

In order to allow the UE to transmit the power preference indication after the link recovery, the network may transmit the power preference indication configuration. The network may transmit the RRC connection re-establishment message by including the power preference indication so that the indication can be transmitted immediately when the link is recovered. When the RRC connection re-establishment procedure is compete, the UE may start and/or restart the stopped prohibit timer. When the prohibit timer expires, the UE may transmit a UE assistance information message including the power preference indication to the network.

According to an embodiment of the present invention, a transmission of a user equipment (UE)-originated indication can be effectively controlled by running a prohibit timer. In doing so, an indiscrete transmission of the UE-originated indication is avoided, thereby being able to prevent a waste of radio resources. The UE-originated indication can be provided to a network and thus optimized configuration information for a UE operation can be provided.

According to an embodiment of the present invention, a control timer which controls UE-originated indication signaling can be properly controlled during a mutual procedure between a UE and a network. In doing so, a transmission of the UE-originated indication can be more flexibly performed, and thus the network can effectively provide configuration information optimized to the UE.

Figure 17:
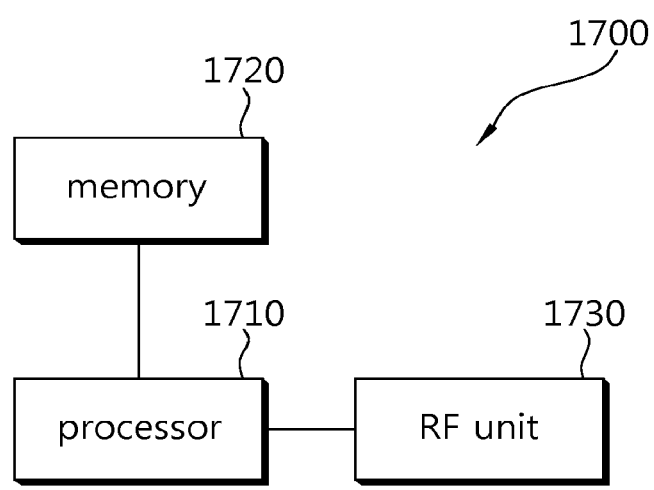
FIG. 17 is a block diagram showing a wireless device according to an embodiment of the present invention.

FIG. 17 is a block diagram showing a wireless device according to an embodiment of the present invention. The device may be configured to implement a signaling method according to the aforementioned embodiment of the present invention with reference to FIG. 13 to FIG. 16.

Referring to FIG. 17, a wireless device 1700 includes a processor 1710, a memory 1720, and a radio frequency (RF) unit 1730. The processor 1710 implements the proposed functions, procedures, and/or methods. The processor 1710 may be configured to control a prohibit timer according to an interaction with a network. The processor 1710 may be configured to transmit a UE-originated indication to the network according to whether the prohibit timer runs. The processor 1710 may be configured to perform a UE-originated indication signaling method according to the aforementioned embodiment of the present invention with reference to the drawings.

The RF unit 1730 coupled to the processor 1710 transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for stopping a prohibit timer in a wireless communication system, the method performed by a user equipment (UE) and comprising:
   starting the prohibit timer related to transmission of power preference information; and
   stopping the prohibit timer based on whether the UE initiates a radio resource control (RRC) re-establishment procedure while the prohibit timer is running,
   wherein, upon initiating the RRC re-establishment procedure, the UE disables the transmission of the power preference information and stops the prohibit timer.

2. The method of claim 1, wherein the power preference information informs a power operation preferred by the UE.

3. The method of claim 2, wherein the power preference information is one of normal power consumption or low power consumption.

4. The method of claim 1, wherein another power preference information is not transmitted to the network while the prohibit timer is running.

5. A user equipment (UE) comprising:
   a radio frequency (RF) transceiver that transmits and receives a radio signal; and
   a processor operatively coupled to the RF transceiver, wherein the processor is configured to:
   start a prohibit timer related to transmission of power preference information; and
   stop the prohibit timer based on whether the UE initiates a radio resource control (RRC) re-establishment procedure while the prohibit timer is running,
   wherein, upon initiating the RRC re-establishment procedure, the UE disables the transmission of the power preference information and stops the prohibit timer.

6. The UE of claim 5, wherein the power preference information informs a power operation preferred by the UE.

7. The UE of claim 6, wherein the power preference information is one of normal power consumption or low power consumption.

8. The UE of claim 5, wherein another power preference information is not transmitted to the network while the prohibit timer is running.

* * * * *